United States Patent Office 3,138,601
Patented June 23, 1964

3,138,601
ALKYL-18-O-TRIALKOXYACETYL RESERPATES
AND DERIVATIVES
Robert Armistead Lucas, Mendham, N.J., assignor to
Ciba Corporation, New York, N.Y., a corporation of
Delaware
No Drawing. Filed Mar. 5, 1962, Ser. No. 177,231
11 Claims. (Cl. 260—287)

The present invention concerns 3-epi-allo-yohimbane compounds having the nucleus of the formula:

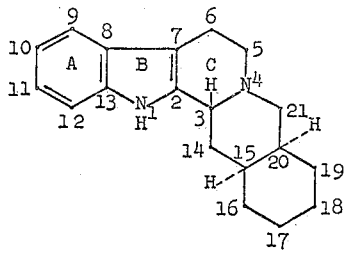

More particularly it relates to 18β-tri-(etherified hydroxymethyl)-acetyloxy-3-epi-allo - yohimbane 16β - carboxylic acid esters, more especially 18β-tri(etherified hydroxymethyl)-acetyloxy-17α-$R_2$-3-epi-allo-yohimban - 16β - carboxylic acid esters, in which $R_2$ represents primarily lower alkoxy, but may also stand for cyano or N-lower alkanoyl-N-lower alkyl-amino, salts, N-oxides or salts of N-oxides of such compounds. Apart from the groups in the 16β-position, 17α-position and 18β-position, the compounds of the present invention may contain addition substitutents. For example, substituents attached to the positions of the aromatic nucleus, i.e. ring A, more specifically to the 9-position, the 10-position, the 11-position and/or the 12-position, are, for example, aliphatic hydrocarbon radicals, such as lower alkyl and the like, etherified hydroxyl, such as lower alkoxy, cycloalkyloxy, cycloalkyl-lower alkoxy, carbocyclic aryloxy, carbocyclic aryl-lower alkoxy, lower alkylenedioxy and the like, esterified hydroxyl, especially halogeno, as well as lower alkoxy-carbonyloxy, lower alkanoyloxy and the like, etherified mercapto, such as lower alkylmercapto and the like, nitro, amino, such as N,N-disubstituted amino and the like, trifluoromethyl or any other suitable substitutent. Other substituents, particularly aliphatic hydrocarbon radicals, such as lower alkyl, may also be attached to positions of other nuclei, particularly of the heterocyclic nucleus C, more specifically to the 5-position and/or the 6-position.

The invention is more particularly directed to compounds of the formula:

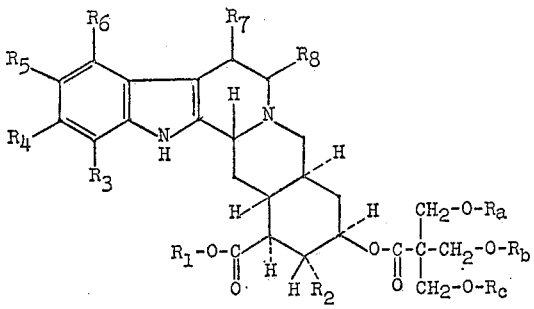

in which $R_1$ is primarily lower alkyl, as well as substituted lower alkyl, such as monocyclic carbocyclic aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkyl-amino-lower alkyl and the like, $R_2$ stands primarily for lower alkoxy, as well as for cyano or N-lower alkanoyl-N-lower alkyl-amino, each of the groups $R_a$—O—, $R_b$—O— and $R_c$—O— stands for an etherified hydroxyl group, each of the groups $R_3$, $R_4$, $R_5$ and $R_6$ stands for hydrogen, an aliphatic hydrocarbon radical, particularly lower alkyl, trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxyl group, esterified hydroxyl, particularly halogeno, as well as lower alkoxy-carbonyloxy, lower alkanoyloxy and the like, etherified mercapto, particularly lower alkyl-mercapto and the like, nitro, amino, e.g. N,N-di-substituted amino and the like, or, whenever two of the groups $R_3$, $R_4$, $R_5$ and $R_6$ are attached to two adjacent positions and are taken together, for lower alkylenedioxy, and each of the groups $R_7$ and $R_8$ stands for hydrogen or lower alkyl, salts, N-oxides or salts of N-oxides of such compounds, as well as process for the preparation of such compounds.

The radical of the alcohol portion of the ester grouping attached to the 16β-position of the molecule, which is represented in the above formula by the group $R_1$, stands above all for lower alkyl having from one to ten carbon atoms; such groups are particularly methyl, ethyl, n-propyl, isopropyl, n-butyl, isobutyl, secondary butyl, n-pentyl, isopentyl, neopentyl, n-hexyl, isohexyl, n-heptyl, isoheptyl, n-octyl, n-nonyl, n-decyl and the like.

The esterifying portion of the ester grouping attached to the 16β-position of the molecule, represented in the above formula by the radical $R_1$, may also stand for a substituted lower alkyl group, such as, for example, a monocyclic carbocyclic aryl-lower alkyl, in which lower alkyl has from one to four carbon atoms, particularly phenyl-lower alkyl, e.g. benzyl, 1-phenylethyl, 2-phenylethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted lower alkyl radicals represented by the group $R_1$ are, for example, lower alkyl substituted by functional groups, such as etherified hydroxyl, particularly lower alkoxy having preferably from one to four carbon atoms, e.g. methoxy, ethoxy, n-propyloxy, isopropyloxy, n-butyloxy and the like, tertiary amino, such as N,N-di-lower alkyl-amino, in which lower alkyl has from one to four carbon atoms, e.g. N,N-dimethylamino, N-ethyl-N-methylamino, N,N-diethylamino, N,N-di-n-propylamino, N,N-di-isopropylamino and the like, as well as 1-N,N-lower alkylene-imino, in which lower alkylene has from four to six ring carbon atoms, e.g. 1-pyrrolidino, 1-piperidino, 1-N,N-hexamethylene-imino and the like, 1-N,N-lower oxa-alkylene-imino, in which lower oxa-alkylene has preferably four ring carbon atoms, e.g. 4-morpholino and the like, or 1-N,N-lower aza-alkylene-imino, in which lower aza-alkylene has preferably from four to six ring carbon atoms, particularly 4-lower alkyl-1-piperazino, e.g. 4-methyl-1-piperazino, 4-ethyl-1-piperazino and the like. The lower alkyl portion of a lower alkyl radical carrying a functional group (as represented, for example, by etherified hydroxy-lower alkyl, tertiary amino-lower alkyl and the like) is lower alkylene having from two to four, preferably from two to three, carbon atoms and separating the functional group from the carboxy portion by at least two, preferably by two to three, carbon atoms. Alkylene radicals of that type are primarily 1,2-ethylene, 1-methyl-1,2-ethylene, 2-methyl-1,2-ethylene, 1,3-propylene, 1,4-butylene and the like. Lower alkyl radicals carrying functional groups are, therefore, 2-lower alkoxy-ethyl, e.g. 2-methoxyethyl, 2-ethoxyethyl, 2-isopropyloxyethyl and the like, 2-lower alkoxy-1-methylethyl, e.g. 2-methoxy-1-methylethyl and the like, 2-lower alkoxy-2-methyl-ethyl, e.g. 2- ethoxy-2-methyl-ethyl and the like, 3-lower alkoxy-propyl, e.g. 3-methoxypropyl, 3-ethoxypropyl and the like, 2-N,N-di-lower alkyl-ethyl, e.g. 2-N,N-dimethylamino-ethyl, 2-N,N-diethylaminoethyl and the like, 2-N,N-di-lower alkyl-1-methyl-ethyl, e.g. 2-N,N-dimethylamino-1-methyl-ethyl and the like, 2-N,N-di-lower alkyl-amino-2-methyl-ethyl, e.g. 2-N,N-dimethylamino-2-methyl-ethyl and the like, 3-N,N-di-lower alkyl-amino-propyl, e.g. 3-N,N-dimethylaminopropyl, 3-N,N-diethylaminopropyl and the like, 2-(1-N,N-lower alkylene-imino)-ethyl, e.g. 2-(1-pyrrolidino)-ethyl, 2-(1-piperidino)-ethyl and the like, 3-(1-N,N-lower alkyl-eneimino)-propyl, e.g. 3-(1-piperidino)-propyl and the like.

A substituent attached to the 17α-position, as represented by the group $R_2$ in the above formula, is primarily lower alkoxy having preferably from one to four carbon atoms, which stands above all for methoxy, as well as ethoxy, n-propyloxy, isobutyloxy and the like. The substituent attached to the 17α-position may also be cyano or N-lower alkanoyl-N-lower alkylamino, e.g. N-acetyl-N-methyl-amino and the like.

The etherified hydroxyl groups (represented in the above formula by the groups $R_a$—O—, $R_b$—O— and $R_c$—O—) in a tri-(etherified hydroxyl-methyl)-acetyloxy group are primarily hydroxyl groups etherified by a lower aliphatic radical represented by $R_a$, $R_b$ and/or $R_c$ in the above formula. These groups stand, therefore, above all for lower alkyl having from one to ten, preferably from one to four, carbon atoms, such as, for example, methyl, ethyl, n-propyl, isopropyl, n-butyl, isobutyl, secondary butyl, tertiary butyl, n-pentyl, isopentyl, neopentyl, n-hexyl, isohexyl, n-heptyl and the like.

Other aliphatic radicals $R_a$, $R_b$ and $R_c$ etherifying the hydroxyl groups in a tri-(etherified hydroxy-methyl)-acetyloxy substituent are lower alkenyl, particularly lower allylic alkenyl, having preferably from three to five carbon atoms, e.g. allyl, 2-methyl-allyl, 2-butenyl, 3-methyl-2-butenyl, 2-pentenyl and the like, lower alkynyl having from three to five carbon atoms, e.g. propargyl and the like, as well as cycloaliphatic radicals, such as cycloalkyl having from three to eight, preferably from five to six ring carbon atoms, e.g. 3-cyclopentenyl, 2-cyclohexenyl and the like.

Aliphatic radicals etherifying the hydroxyl groups in a tri-(etherified hydroxy-methyl)-acetyloxy group and represented in the above formula by $R_a$, $R_b$ and/or $R_c$, may carry substituents, such as, for example, cycloaliphatic radicals. Resulting substituted aliphatic radicals are cycloaliphatic-aliphatic radicals, for example, cycloalkyl-lower alkyl, in which cycloalkyl has from three to eight, especially from five ot six, ring carbon atoms, and lower alkyl has from one to four carbon atoms, e.g. cyclopentylmethyl, 1-cyclopentylethyl, 2-cyclopentylethyl, cyclohexylmethyl, 2-cyclohexylethyl and the like, cycloalkyl-lower alkenyl, in which cycloalkyl has the above-given meaning, and lower alkenyl has preferably from three to five carbon atoms, e.g. 3-cyclopentylallyl and the like.

Other substituted aliphatic radicals etherifying the hydroxyl groups in a tri-(etherified hydroxy-methyl)-acetyloxy group (represented in the above formula by $R_a$, $R_b$ and/or $R_c$) may carry as substitutents carbocyclic aryl groups and represent, for example, carbocyclic aryl-aliphatic radicals, such as monocyclic carbocyclic aryl-lower alkyl, particularly phenyl-lower alkyl, e.g. benzyl, diphenylmethyl, 1-phenylethyl, 2-phenylethyl and the like, as well as carbocycic-lower alkenyl, such as monocyclic carbocyclic aryl-lower alkenyl, particularly phenyl-lower alkenyl, e.g. 3-phenyl-allyl and the like, and analogous radicals, in which the carbocyclic aryl nucleus is substituted by one or more than one of the same or different substitutents, for example, by lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, trifluoromethyl, nitro, amino, such as N,N-di-lower alkylamino, e.g. N,N-dimethylamino and the like, or any other suitable substituent.

Etherifying groups of a tri-(etherified hydroxy-methyl)-acetyloxy group, which are represented in the above formula $R_a$, $R_b$ and/or $R_c$, may also be carbocyclic aryl, particularly monocyclic carbocyclic aryl, such as phenyl or phenyl substituted by one or more than one of the same of different substituents, such as lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, trifluoromethyl, nitro, amino, such as N,N-di-lower alkylamino, e.g. N,N-dimethylamino and the like, or any other suitable substituents.

Substituents attached to any of the positions available for substitution in ring A and represented in the above formula by the groups $R_3$, $R_4$, $R_5$ and $R_6$ (each of which may also stand for hydrogen) may be, for example, lower aliphatic hydrocarbon radicals, especially lower alkyl, having preferably from one to four carbon atoms, e.g. methyl, ethyl, n-propyl, isopropyl, n-butyl and the like, or functional groups, such as, for example, etherified hydroxyl, particularly lower alkoxy, having preferably from one to four carbon atoms, e.g. methoxy, ethoxy, n-propyloxy, isopropyloxy, n-butyloxy, isobutyloxy and the like, as well as cycloalkyloxy, in which cycloalkyl has from three to eight, preferably from five to six, ring carbon atoms, e.g. cyclopentyloxy, cyclohexyloxy and the like, cycloalkyl-lower alkoxy, in which cycloalkyl has from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno, e.g. fluoro, chloro, bromo, iodo and the like, as well as lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, having preferably from one to four carbon atoms, e.g. methylmercapto, ethylmercapto and the like, nitro, amino, particularly N,N-disubstituted amino, such as N,N-di-lower alkylamino, e.g. N,N-dimethylamino, N-ethyl-N-methyl-amino, N,N-diethylamino and the like, trifluoromethyl and the like, or any other suitable functional group. A substituent may also be attached to two adjacent positions of ring A and form a fused-on ring; for example, two of the radicals $R_3$, $R_4$, $R_5$ and $R_6$ in the formula, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions available for substitution in ring C, are primarily aliphatic hydrocarbon radicals, such as lower alkyl, having preferably from one to four carbon atoms, particularly methyl, as well as ethyl, n-propyl, isopropyl and the like. Thus, radicals $R_7$ and $R_8$ in the above formula, which stand primarily for hydrogen, may also represent lower alkyl, particularly methyl, as well as ethyl and the like.

Salts of the compounds of this invention are primarily the pharmaceutically acceptable, non-toxic acid addition salts, such as those with inorganic acids, e.g. hydrochloric, hydrobromic, sulfuric, phosphoric acids and the like, or with organic acids, such as organic carboxylic acids, e.g. acetic, succinic, maleic, fumaric, tartaric, citric acid and the like, or organic sulfonic acids, e.g. methane sulfonic, 2-hydroxyethane sulfonic, ethane 1,2-disulfonic, p-toluene sulfonic acid and the like.

Also included within the scope of the present invention are the N-oxides of the above compounds, as well as the pharmaceutically acceptable, non-toxic acid addition salts of such N-oxides, for example, those with the above-mentioned inorganic or organic acids.

In view of the fact that several asymmetric carbon atoms are present in the compounds of this invention, the latter may be obtained in the form of mixtures of racemates, racemates or optically pure compounds.

The compounds of the present invention are characterized by strong antifibrillatory effects, which, so far, have not been observed either in the naturally occuring Rauwolfia ester alkaloids, such as, for example, reserpine, deserpidine, rescinnamine and the like, or synthetically prepared ester analogs thereof. The sedative and tranquilizing, as well as the antihypertensive properties characteristic of the latter, are not as pronounced in the compounds of this invention and are associated with only some of the species.

The compounds of the present invention can, therefore, be used above all in the treatment of cardiac irregularities, including extrasystoles, auricular fibrillation and the like. Those having sedative or antihypertensive effects may be used as sedative and tranquilizing agents to relieve states of hyperactivity, tension and agitation, as, for example, associated with mental disturbances and disorders, anxiety and the like, or as antihypertensive agents to counteract hypertensive conditions, such as, for example, renal hypertension, toxemia and the like.

A preferred group of compounds having the above properties is represented by the formula:

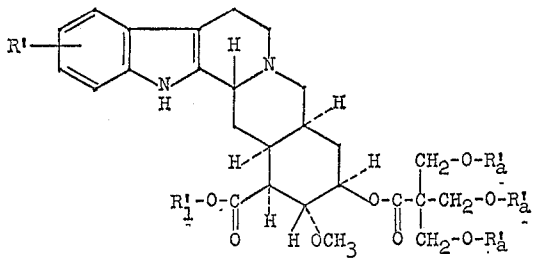

in which the group $R_1'$ is lower alkyl, having from one to seven carbon atoms, e.g. methyl, ethyl, n-propyl, isopropyl, n-butyl, isobutyl, n-pentyl, neopentyl, n-hexyl, isohexyl, n-heptyl and the like, the group $R_a'$ is lower alkyl, having preferably from one to seven carbon atoms, especially methyl, as well as ethyl, n-propyl, isopropyl, n-butyl, isobutyl, n-pentyl, neopentyl, n-hexyl, isohexyl, n-heptyl and the like, $R'$ is hydrogen or more especially lower alkoxy having from one to four carbon atoms, particularly methoxy, as well as ethoxy, n-propyloxy, isopropyloxy, n-butyloxy and the like, whereby a lower alkoxy substituent representing $R_4$ is preferably attached to the 10-position or the 11-position, or pharmaceutically acceptable, non-toxic acid addition salts thereof. Particularly outstanding pharmacological effects are exhibited by the lower alkyl 18-O-tri-(lower alkoxy-methyl)-acetyl-reserpates, especially the lower alkyl 18-O-tri-(methoxy-methyl)-acetyl-reserpates, or the pharmaceutically acceptable acid addition salts of such compounds.

The compounds of this invention may be used in the form of pharmaceutical preparations for enteral or parenteral use, which contain the pharmacologically active ingredient in admixture with an organic or inorganic, solid or liquid carrier. For making up such preparations, there can be employed inert substances, which are compatible with the active ingredient, such as water, gelatine, lactose, starches, stearic acid, magnesium stearate, stearyl alcohol, talc, vegetable oils, benzyl alcohol, gums, waxes, propylene glycol, polyalkylene glycols or any other known carrier used in pharmaceutical preparations. The latter may be in solid form, for example, as tablets, capsules, dragees and the like, or in liquid form, for example, as solutions, suspensions, emulsions and the like. If desired, they may contain additional substances, such as preserving, stabilizing, wetting, emulsifying agents and the like, salts for varying the osmotic pressure, buffers or any other auxiliary substances. They may also contain, in combination, other useful compounds.

The compounds of this invention may be prepared according to known methods. For example, they may be obtained by converting in an 18β-hydroxy-3-epi-allo-yohimbane 16β-carboxylic acid ester or an N-oxide thereof, the free hydroxyl group into the desired tri-(etherified hydroxy-methyl)-acetyloxy group, and, if desired, converting a resulting salt into the free compound or another salt, and/or, if desired, converting in a resulting compound the 16β-esterified carboxyl group into another esterified carboxyl group, and/or, if desired, converting a resulting N-oxide into the free compound, and/or, if desired, converting a resulting compound into an N-oxide thereof, and/or, if desired, converting a free compound into a salt thereof, and/or, if desired, separating a mixture of isomeric compounds into the single isomers.

Conversion of the free 18β-hydroxyl group into the desired esterified hydroxyl group is achieved according to known methods, for example, by treatment of the starting material with a reactive functional derivative of a tri-(etherified hydroxymethyl)-acetic acid. Such functional derivative is particularly an acid halide, e.g. chloride and the like, or the anhydride of such acid, which reagents are represented, for example, by the tri-(lower alkoxy-methyl)-acetyl chloride, especially by the tri-(methoxy-methyl)-acetyl chloride.

The reaction is preferably carried out in the presence of a suitable base, particularly an organic base, e.g. pyridine, collidine and the like, or any other analogous reagent used in an equivalent esterification reaction. Preferably, it is performed in the presence of a diluent; the liquid organic base used as the reagent may simultaneously serve as the solvent, or any other suitable inert solvent may be used. If necessary, the reaction is performed while cooling or at an elevated temperature, and/or in the atmosphere of an inert gas, e.g. nitrogen.

The starting materials and reagents used in the above reaction are known, or may be prepared according to methods used for the known ones. The tri-(etherified hydroxy-methyl)-acetic acid may be prepared using the method described by Orthner et al., Annalen, vol. 484, p. 131 (1930) and Nerdel et al., Berichte, vol. 91, p. 938 (1958); this method involves the preparation of the monoacetonide of pentaerythritol (for example, by treating a solution of the pentaerythritol in water with acetone in the presence of hydrochloric acid), etherifying the free hydroxyl groups in the monoacetonide of pentaerythritol (for example, by treatment with a reactive ester of an aliphatic alcohol, such as with a di-lower alkyl sulfate in the presence of an alkali metal hydroxide; in such reaction the acetonide is split), oxidizing the resulting tri-etherified pentaerythritol (for example, by treatment with potassium permanganate in the presence of an alkali metal hydroxide) and converting the resulting tri-(etherified hydroxy-methyl)-acetic acid into its reactive functional derivative according to known methods (for example, into its chloride by treatment with thionyl chloride).

The compounds of this invention may also be obtained by removing in a $\Delta^3$-18β-tri-(etherified hydroxy-methyl)-acetyloxy-allo-yohimbene 16β-carboxylic acid ester or a salt thereof, the double bond extending from the 3-position and isolating the desired 18β-tri-(etherified hydroxy-methyl)-acetyloxy-3-epi-allo-yohimbane 16β - carboxylic acid ester or a salt thereof, and, if desired, carrying out the optional steps.

In the starting material the double bond extends from the 3-position to the 14-position, whenever it is present in the form of the free base, and from the 3-position to the 4-position, whenever it is present in the form of a salt; the double bond is also in the 3(4)-position, whenever the free base is dissolved in a polar solvent.

The anion of the salts of the starting material is primarily that of a strong inorganic acid, e.g. hydrochloric, hydrobromic, phosphoric acid, or of a halogenophosphoric acid, e.g. chlorophosphoric acid and the like, or perchloric acid or any other suitable acid. It may also represent the anion of an organic acid; a salt with an organic acid may be formed whenever a solution of the starting material in an organic acid, e.g. acetic acid and the like, is used in the above-described removal procedure.

The removal of the double bond may be carried out by known reduction methods, for example, by using nascent hydrogen in an acid medium. For example, a solution of the starting material may be treated with a metal in the presence of an acid, such as, for example, acetic acid (preferably in the form of aqueous acetic acid), perchloric acid (e.g. aqueous perchloric acid) and the like. Particularly useful as a reducing agent is zinc in the presence of an acid, e.g. acetic, perchloric acid and the like. Zinc in the presence of perchloric acid, which may be used in an aqueous mixture or in admixture with another acid, e.g. acetic acid and the like, represents the preferred reagent; this reagent is particularly suitable, because the rate of reduction is fast and the contact of the starting material, as well as the reduction product, with the acidic medium can be kept to a minimum. Organic diluents, such as ethers, e.g. tetrahydrofuran, p-dioxan and the like, lower alkanones, e.g. acetone and the like, or any other suitable solvent or solvent mixtures may be used as additional diluents, if desired, together with water. The reduction may be carried out at room temperature, or, if necessary, while cooling or at an elevated temperature.

The starting materials used in the above reaction are prepared according to known methods, for example, by esterifying in an 18β-hydroxy-3-oxo-2,3-seco-allo-yohimbane 16β-carboxylic acid ester the 18β-hydroxyl group by treatment with a reactive functional derivative of a tri-(etherified hydroxy-methyl)-acetic acid and reacting a resulting 18β-tri-(etherified hydroxy-methyl)-acetyloxy-3-oxo-2,3-seco-allo-yohimbane 16β-carboxylic acid ester with an appropriate acidic ring closing reagent, and, if desired, converting a resulting salt into the free compound.

The esterification of the free hydroxyl group is carried out as previously shown, preferably by reacting the intermediate with an acid halide, e.g. chloride and the like, or the anhydride of a tri-(etherified hydroxy-methyl)-acetic acid, preferably in the presence of a base, e.g. pyridine and the like. Ring closure of the above-described 2,3-seco-allo-yohimbane compounds is carried out according to known methods, for example, by treatment with a phosphoric acid, e.g. polyphosphoric acid and the like, a phosphorus halide, e.g. phosphorus trichloride, phosphorus pentachloride, or advantageously a phosphorus oxyhalide, e.g. phosphorus oxychloride and the like, preferably at an elevated temperature.

A further method for the preparation of the compounds of this invention comprises isomerizing an 18β-tri-(etherified hydroxy-methyl)-acetyloxy-allo-yohimbane 16β-carboxylic acid ester, a salt, an N-oxide or a salt of an N-oxide thereof, by treatment with an acid and isolating the desired 18β-tri-(etherified-hydroxy-methyl)-acetyloxy-3-epi-allo-yohimbane 16β-carbonxlic acid ester, a salt, an N-oxide or a salt of an N-oxide thereof, and, if desired, carrying out the optional steps.

Acids used in the above isomerization procedure are, for example, organic carboxylic acids, particularly aliphatic hydrocarbon carboxylic acids, such as lower alkanoic acids, e.g. acetic, propionic acid and the like, primarily glacial acetic acid, organic sulfonic acids, particularly monocyclic carbocyclic aryl sulfonic acids, e.g. p-toluene sulfonic acid and the like, as well as lower alkane sulfonic acids, e.g. methane sulfonic acid and the like, or strong mineral acids, such as hydrohalic acids, e.g. hydrochloric acid and the like, or mixtures of acids. The reaction may be carried out in the absence or presence of an additional solvent; for example, p-toluene sulfonic acid may also be used in the presence of an organic base, e.g. collidine and the like, whereas hydrogen chloride may be used in an anhydrous lower alkanol, e.g. methanol and the like. Isomerization may occur at room temperature, if necessary, at an elevated temperature, in a closed vessel, and/or in an atmosphere of an inert gas, e.g. nitrogen.

Optimum yields in the isomerization reaction are achieved by removing the desired product from the reaction milieu, thus displacing the reaction equilibrium in favor of the product. The removal may be accomplished by separating the product, if desired, in the form of a salt thereof, from the starting material by exploiting the different relative solubilities in different solvent systems. For example, the product or a salt thereof may be separated from the starting material or a salt thereof either by adsorption on a suitable material, such as aluminum oxide, paper and the like, and subsequent fractional elution, or by fractional crystallization from a solvent or solvent mixture. The starting material separated from the desired product may be recycled into the isomerization process, to enhance the overall yield of the procedure.

The 18β-tri-(etherified hydroxy-methyl)-acetyloxy-allo-yohimbane 16β-carboxylic acid ester compounds used as the starting materials in the above isomerization procedure may be prepared, for example, by removing in a Δ³-18β-tri-(etherified hydroxy-methyl)-acetyloxy-allo-yohimbene 16β-carboxylic acid ester or a salt thereof, the double bond extending from the 3-position and isolating the desired 18β-tri-(etherified hydroxy-methyl)-acetyloxy-allo-yohimbane 16β-carboxylic acid ester, and, if desired, carrying out the optional steps.

The above removal of the double bond extending from the 3-position is preferably carried out in a neutral or alkaline medium, for example, by catalytic hydrogenation, such as treatment with hydrogen in the presence of a catalyst containing a metal of the eighth group of the Periodic System, e.g. nickel, platinum and the like, preferably in the presence of a solvent, such as a lower alkanol, e.g. methanol, ethanol and the like, or another suitable diluent. The reduction may be carried out at normal or under increased pressure, and/or, if necessary, while cooling, or at an elevated temperature. The removal of the double bond may also be accomplished by treatment with a light metal hydride, particularly a light metal borohydride, such as an alkali metal borohydride, e.g. lithium borohydride, sodium borohydride, potassium borohydride and the like, an alkaline earth metal borohydride, e.g. calcium borohydride, barium borohydride, strontium borohydride, e.g. sodium trimethoxy-borohydride and the like, or an aluminum hydride, such as an alkali metal aluminum hydride, e.g. lithium aluminum and the like, or any other suitable hydride reagent. The reagents are preferably used in the presence of a suitable solvent, the choice of which depends largely on the type of hydride reagent used. If necessary, the temperature may be elevated, and/or, the reaction may be carried out under the atmosphere of an inert gas, e.g. nitrogen. The reduction of the double bond extending from the 3-position may also be achieved by treatment of the starting material with a metal amalgam in the presence of a moist solvent, such as an alkali metal amalgam, e.g. sodium amalgam and the like, or aluminum amalgam in the presence of a moist ether or any other suitable solvent.

In a resulting compound, the 16β-esterified carboxyl group may be converted into another esterified carboxyl group, for example, by transesterification. The latter may be carried out by reacting the resulting compound with an alcohol, for example, an alcohol of the formula $R_1$-OH, in which $R_1$ has the previously-given meaning, particularly a lower alkanol, preferably in the presence of a suitable transesterification reagent, such as a metal compound of the alcohol, as particularly an alkali metal, e.g. sodium, potassium and the like, compound thereof, or any other suitable reagent, e.g. benzyl trimethyl ammonium hydroxide, potassium cyanide and the like. If necessary, the reaction is carried out at an elevated temperature, in a closed vessel and/or in the atmosphere of an inert gas, e.g. nitrogen.

A 16β-esterified carboxyl group may also be converted into another esterified carboxyl group by hydrolysis and subsequent esterification. Hydrolysis may be achieved, for example, by treatment with an alkali metal hydroxide, e.g. lithium hydroxide, sodium hydroxide, potassium hydroxide and the like, in the presence of a lower alkanol, e.g. methanol, ethanol and the like, preferably in admixture with water. Esterification of the 16β-carboxyl group is carried out by treatment with a diazo-reagent, particularly a lower diazo-alkane. The reagent is preferably used in the form of a solution thereof in an inert solvent, and may be added to the starting material or a solution thereof; suitable solvents are, for example, ethers, e.g. diethyl ether, tetrahydrofuran and the like, lower alkanols, e.g. methanol, ethanol and the like, halogenated hydrocarbons, e.g. chloroform, methylenechloride and the like, or any other appropriate solvents. An excess of the diazo-compound present after the completion of the reaction may be destroyed, for example, by adding an additional carboxylic acid, such as acetic, benzoic acid and the like.

A resulting salt may be converted into the free compound by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate, ammonia or any other suitable alkaline reagent, or with a hydroxyl ion exchange preparation.

A resulting salt may be converted into another salt, for example, by treatment with a metal salt of an acid, e.g. silver chloride, sodium maleate and the like, in the presence of a suitable solvent.

A free compound, including an N-oxide may be converted into a salt thereof by treatment with an inorganic or organic acid; the reaction may be carried out, for example, by treating a solution of the free base in an inert solvent or solvent mixture with one of the acids mentioned above or a solution thereof and isolating the resulting salt, which may be isolated containing water or solvent of crystallization.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, or a persulfonic acid, e.g. p-toluene persulfinic acid and the like. In the N-oxidation reaction an excess of the oxidation reagent and/or an increase in temperature should be avoided in order to prevent oxidative degradation.

An N-oxide may be converted into the free compound according to known reduction procedures, for example, by treatment with hydrogen in the presence of a catalyst, which contains a metal of the eighth group of the Periodic System, such as nickel, platinum, palladium and the like, e.g. Raney nickel, platinum oxide and the like, or more appropriately, with nascent hydrogen, as generated, for example, by a metal, e.g. zinc, tin and the like, in the presence of an acid, e.g. acetic acid and the like, or a base, or with any other appropriate reducing reagent or method.

The compounds of the present invention, as well as the starting materials and intermediates used in their formation, may be present in the form of mixtures of racemates, single racemates or antipodes.

Mixtures of racemates of final products or starting materials may be separated into the single racemates on the basis of physico-chemical difference, for example, by fractionated crystallization and the like.

Racemates of intermediates and final products may be resolved into the antipodes according to known methods. Racemates forming acid addition salts may be resolved, for example, by treating a solution of the free racemic base with one of the optically active forms of an acid having an asymmetric carbon atom, if desired, a solution thereof. Especially useful as optically active forms of salt-forming acids having an asymmetric carbon atom are D-tartaric acid (l-tartaric acid) and L-tartaric acid (or d-tartaric acid), as well as the optically active forms of di-o-toluyl-tartaric, malic, mandelic, camphor 10-sulfonic, quinic acid and the like. A salt may then be isolated, which is formed by the optically active acid with one of the optically active forms of the base. From a resulting salt, the free and optically active compound may be liberated, and, if desired, the latter may be converted into an acid addition salt, an N-oxide or an acid addition salt of an N-oxide thereof, described hereinabove.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

This is a continuation-in-part application of my application Serial No. 114,642, filed June 5, 1961, now abandoned.

The following examples illustrate the invention and are not to be construed as being limitations thereon. Temperatures are given in degrees centigrade.

*Example 1*

A mixture of 5.0 g. of methyl reserpate and tri-(methoxymethyl)-acetyl chloride, prepared from 2.75 g. of tri-(methoxymethyl)-acetic acid and 5 ml. of thionyl chloride, in 50 ml. of dry pyridine is allowed to stand at room temperature for three days and is then poured into 600 ml. of cold water. The aqueous solution is made basic with 10 ml. of concentrated aqueous ammonia, whereupon an oil separates which solidifies and is filtered off and washed with water. A solution of the solid material in methylene chloride is passed through a column containing a diatomaceous earth preparation; the filtrate is then evaporated under reduced pressure, and the residue is dissolved in hot ethanol. The ethanol solution is partly evaporated, a precipitate is formed on scratching and a small amount of petroleum ether is added. The precipitate is filtered off, and the desired methyl 18-O-tri-(methoxymethyl)-acetyl reserpate of the formula:

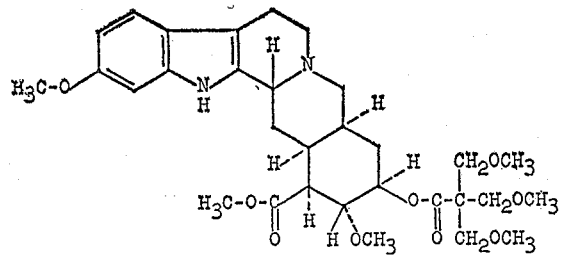

is recrystallized by dissolving it in a mixture of ethanol and methylene chloride and removing the latter by evaporation under a nitrogen atmosphere, and adding petroleum ether, M.P. 223–228°; $[\alpha]^{25°}_D = -82°$ (chloroform); yield: 3.44 g.

The starting material may be prepared as follows: A mixture of 200 g. of pentaerythritol, 2,400 ml. of acetone, 740 ml. of water and 92 ml. of concentrated aqueous hydrochloric acid is stirred for 16 hours. The solid material is filtered off, the filtrate is neutralized with solid potassium carbonate and the organic layer is separated, filtered and concentrated to a small volume. Upon cooling, a precipitate is formed, which is extracted with boiling xylene; the desired monoacetonide of pentaerythritol precipitates from the xylene solution upon cooling, M.P. 130–134°; yield: 42.7 g. An additional amount of 13.7 g. of the monoacetonide of pentaerythritol is obtained by re-extracting the acetone precipitate with xylene.

To a solution of 10.0 g. of the monoacetonide of pentaerythritol in 20 ml. of water is added simultaneously 50 ml. of dimethyl sulfate and 50 ml. of a 50 percent aqueous solution of potassium hydroxide; the mixture (basic to methyl orange) is stirred at 70–72° and then at 100° for an additional half-hour. The organic material is extracted three times with chloroform, the organic solution is dried over sodium sulfate and evaporated. The residue is fractionally distilled and the tri-methyl ether of pentaerythritol is collected at 98–104°/12 mm.

To a solution of 19.9 g. of the trimethyl ether of pentaerythritol in 92.4 ml. of a 35 percent aqueous solution of sodium hydroxide and 83.1 ml. of water, kept at 15–20°, is added 23.5 g. of potassium permanganate in portions. The oxidation mixture is stirred for an additional half-hour and is then filtered. The filtrate is acidified with 50 percent aqueous sulfuric acid, the inorganic precipitate is filtered off, and the desired tri-(methoxymethyl)-acetic acid crystallizes on standing, M.P. 110–115°; yield: 3.55 g.

A mixture of 2.75 g. of tri-(methoxymethyl)-acetic acid in 5 ml. of thionyl chloride is refluxed for three hours. The excess of thionyl chloride is evaporated under reduced pressure, and the desired tri-(methoxymethyl)-acetyl chloride is distilled, B.P. 103–104°/about 15 mm.

*Example 2*

A solution of 1.0 g. of methyl 18-O-tri-(methoxymethyl)-acetyl-reserpate in 1.75 ml. of 1 N aqueous hydrochloric acid and 25 ml. of water is lyophylized to yield 1.04 g. of methyl 18-O-tri-(methoxymethyl)-acetyl-reserpate hydrochloride dihydrate, M.P. 189–198°.

Other salts, such as the sulfate, maleate and the like, may be prepared accordingly.

*Example 3*

A mixture of 5.0 g. of n-propyl reserpate and 2.5 ml. of tri-(methoxymethyl)-acetyl chloride in 50 ml. of dry pyridine is allowed to stand at room temperature for three days and is then poured into 600 ml. of water. The solution is made basic with ammonium hydroxide, the brown precipitate filtered off, washed with water and dissolved in methylene chloride. The organic solution is filtered through a diatomaceous earth preparation and evaporated to dryness to yield 4.38 g. of a residue, which is dissolved in 100 ml. of methylene chloride. The solution is partitioned between 2 percent aqueous hydrochloric acid in three separation funnels. The methylene chloride extracts are combined and evaporated to dryness to yield 2.57 g. of n-propyl 18-O-tri-(methoxymethyl)-acetyl-reserpate of the formula:

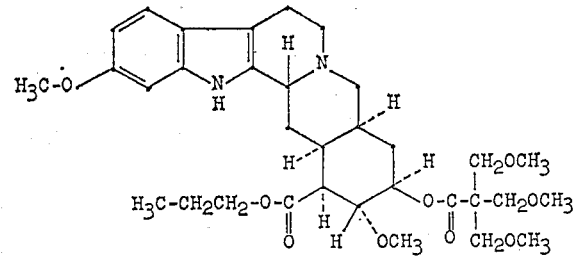

which is crystallized from ethanol, M.P. 150–154°; $[\alpha]^{24°}_D = -68°$ (in chloroform).

*Example 4*

A mixture of 0.4 g. of n-propyl 18-O-tri-(methoxymethyl)-acetyl-reserpate and 0.65 ml. of 1 N aqueous hydrochloric acid in 21 ml. of water is lyophylized to yield 0.42 g. of n-propyl 18-O-tri-(methoxymethyl)-acetyl-reserpate hydrochloride sesquihydrate, M.P. 183–184°.

*Example 5*

A mixture of 2.6 g. of n-hexyl reserpate and 1.0 ml. of tri-(methoxymethyl)-acetyl chloride in 30 ml. of dry pyridine is allowed to stand at room temperature for three days and is then poured into 600 ml. of water containing ammonium hydroxide. The brown solid precipiate is filtered off and dissolved in methylene chloride; the organic solution is filtered through a diatomaceous earth preparation and evaporated. The residue is partitioned as shown in Example 3 to yield 2.24 g. of n-hexyl 18-O-tri-(methoxymethyl)-acetyl-reserpate of the formula:

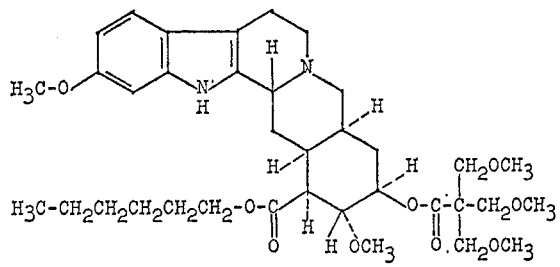

which crystallizes from a mixture of ethyl acetate and petroleum ether and then from methanol containing a small amount of methylene chloride, and is purified by recrystallization from methanol, M.P. 161–165°; $[\alpha]^{24°}_D = -64°$ (in chloroform).

*Example 6*

A mixture of isobutyl reserpate and 1.28 ml. of tri-(methoxymethyl)-acetyl chloride in 30 ml. of dry pyridine is allowed to stand at room temperature for three days and is then poured into water. The aqueous mixture is made basic with ammonium hydroxide. The oily product is freed from the liquid phase and washed by decanting with water. A solution of the oil in methylene chloride is treated according to the procedure of Example 3 to yield after partitioning 0.58 g. of isobutyl 18-O-tri-(methoxymethyl)-acetyl-reserpate of the formula:

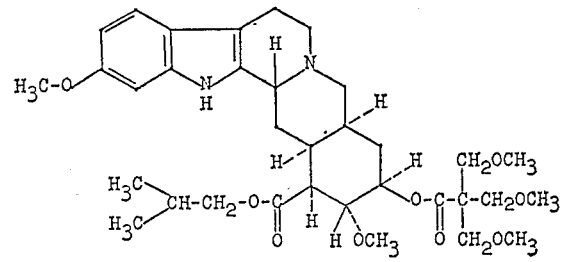

which is crystallized and recrystallized from methanol, M.P. 153–155°; $[\alpha]^{24°}_D = -65°$ (in chloroform).

Other 18β-tri-(etherified hydroxy-methyl)-acetyloxy-3-epi-allo-yohimbane 16β-carboxylic acid esters, which may be prepared according to the above procedure are, for example, other lower alkyl 18-o-tri-(lower alkoxy-methyl)-acetyl reserpates, e.g.
methyl 18-O-tri-(ethoxymethyl)-acetyl-reserpate,
methyl 18-O-tri-(n-propyloxymethyl)-acetyl-reserpate,
methyl 18-o-tri-(isopropyloxymethyl)-acetyl-reserpate,
methyl 18-O-tri-(n-butyloxymethyl)-acetyl-reserpate,
ethyl 18-O-tri-(methoxymethyl)-acetyl-reserpate,
ethyl 18-O-tri-(ethoxymethyl)-acetyl-reserpate,
n-propyl 18-O-tri-(ethoxymethyl)-acetyl-reserpate,
isopropyl 18-O-tri-(methoxymethyl)-acetyl-reserpate,
n-butyl 18-O-tri-(methoxymethyl)-acetyl-reserpate,
isobutyl 18-O-tri-(ethoxymethyl)-acetyl-reserpate, n-pentyl 18-O-tri-(methoxymethyl)-acetyl-reserpate,
n-hexyl 18-O-tri-(ethoxymethyl)-acetyl-reserpate and the like, as well as
lower alkyl 18-O-tri-(lower alkoxymethyl)-acetyl-9-methoxy-deserpidates, e.g.
methyl 9-methoxy -18-O-tri-(methoxymethyl)-acetyl-deserpidate,
methyl 18-O-tri-(ethoxymethyl)-acetyl-9-methoxy-deserpidate,
ethyl 9-methoxy-18-O-tri-(methoxymethyl)-acetyl-deserpidate and the like,
lower alkyl 18-o-tri-(lower alkoxymethyl)-acetyl-10-methoxy-deserpidates, e.g.
methyl 10-methoxy-18-O-tri-(methoxymethyl)-acetyl-deserpidate,
methyl 18-O-tri-(ethoxymethyl)-acetyl-10-methoxy-deserpidate,
ethyl 10-methoxy-18-O-tri-(methoxymethyl)-acetyl-deserpidate,
n-propyl 10-methoxy-18-O-tri-(methoxymethyl)-acetyl-deserpidate,
isopropyl 10-methoxy-18-O-tri-(methoxymethyl)-acetyl-deserpidate,
n-pentyl 10-methoxy-18-O-tri-(methoxymethyl)-acetyl-deserpidate and the like,
lower alkyl 11-ethoxy-18-O-tri-(lower alkoxy-methyl)-acetyl-deserpidates, e.g.
methyl 11-ethoxy-18-O-tri-(methoxymethyl)-acetyl-deserpidate,
methyl 11-ethoxy-18-O-tri-(ethoxymethyl)acetyl-deserpidate and the like,
lower alkyl 18-O-tri-(lower alkoxy-methyl)-acetyl-11-n-propyloxy-deserpidates, e.g.
methyl 18-O-tri-(methoxymethyl)-acetyl-11-n-propyloxy-deserpidate,
methyl 18-O-tri-(ethoxymethyl)-acetyl-11-n-propyloxy-deserpidate and the like,
lower alkyl 11-isopropyloxy-18-O-tri-(lower alkoxymethyl)-acetyl-deserpidates, e.g.
methyl 11-isopropyloxy-18-O-tri-(methoxymethyl)-acetyl-deserpidate,
ethyl 11-isopropyloxy-18-O-tri-(methoxymethyl)-acetyl-deserpidate and the like,
lower alkyl 11-n-butyloxy-18-O-tri-(lower alkoxymethyl)-acetyl-deserpidates, e.g.
methyl 11-n-butyloxy-8-O-tri-(methoxymethyl)-acetyl-deserpidate,
methyl 11-n-butyloxy-18-O-tri-(ethoxymethyl)-acetyl-deserpidate and the like,
lower alkyl 18-O-tri-(lower alkoxy-methyl)-acetyl-12-methoxy-deserpidates, e.g.
methyl 12-methoxy-18-O-tri-(methoxymethyl)-acetyl-deserpidate,
ethyl 12-methoxy-18-O-tri-(methoxymethyl)-acetyl-deserpidate and the like, and
lower alkyl 18-O-tri-(lower alkoxy-methyl)-acetyl-deserpidates, e.g.
methyl 18-O-tri-(methoxymethyl)-acetyl-deserpidate,
methyl 18-O-tri-(ethoxymethyl)-acetyl-deserpidate,
methyl 18-O-tri-(n-propyloxymethyl)-acetyl-deserpidate,
ethyl 18-O-tri-(methoxymethyl)-acetyl-deserpidate,
n-propyl 18-O-tri-(methoxymethyl)-acetyl-deserpidate,
isopropyl 18-O-tri-(methoxymethyl)-acetyl-deserpidate,
n-hexyl 18-O-tri-(methoxymethyl)-acetyl-deserpidate and the like, or the salts thereof. Other compounds are, for example,
lower alkyl 18-O-tri-(lower alkoxy-methyl)-acetyl-5-methyl-reserpates, e.g.
methyl 5-methyl 18-O-tri-(methoxymethyl)-acetyl-reserpate,
methyl 18-O-tri-(ethoxymethyl)-acetyl-5-methyl-reserpate,
ethyl 5-methyl-18-O-tri-(methoxymethyl)-acetyl-reserpate and the like,
lower alkyl 18-O-tri-(lower alkoxy-methyl)-acetyl-6-methyl-reserpates, e.g.
methyl 6-methyl-18-O-tri-(methoxymethyl)-acetyl-reserpate,
methyl 18-O-tri-(ethoxymethyl)-acetyl-6-methyl-reserpate,
ethyl 6-methyl-18-O-tri-(methoxymethyl)-acetyl-reserpate and the like,
lower alkyl 18-O-tri-(lower alkoxy-methoxy)-acetyl-6-methyl-deserpidates, e.g.
methyl 18-O-tri-(methoxymethyl)-acetyl-6-methyl-deserpidate,
methyl 18-O-tri-(ethoxymethyl)-acetyl-6-methyl-deserpidate,
ethyl 18-O-tri-(methoxymethyl)-acetyl-6-methyl-deserpidate and the like,
lower alkyl 18-O-tri-(lower alkoxy-methyl)-acetyl-9-methyl-deserpidates, e.g.
methyl 18-O-tri-(methoxymethyl)-acetyl-9-methyl-deserpidate,
methyl 18-O-tri-(ethoxymethyl)-acetyl-9-methyl-deserpidate,
n-propyl 18-O-tri-(methoxymethyl)-acetyl-9-methyl-deserpidate and the like,
lower alkyl 18-O-tri-(lower alkoxymethyl)-acetyl-11-methyl-deserpidates, e.g.
methyl 18-O-tri-(methoxymethyl)-acetyl-11-methyl-deserpidate,
ethyl 18-O-tri-(methoxymethyl)-acetyl-11-methyl-deserpidate,
ethyl 18-O-tri-(ethoxymethyl)-acetyl-11-methyl-deserpidate and the like,
lower alkyl 18-O-tri-(lower alkoxy-methyl)-acetyl-10-methoxy-reserpates, e.g.
methyl 10-methoxy-18-O-tri-(methoxymethyl)-acetyl-reserpate,
methyl 18-O-tri-ethoxymethyl)-acetyl-10-methoxy-reserpate,
ethyl 10-methoxy-18-O-tri-(methoxymethyl)-acetyl-reserpate and the like,
lower alkyl 9,10-dimethoxy-18-O-tri-(lower alkoxy-methyl)-acetyl-reserpates, e.g.
methyl 9,10-dimethoxy-18-O-tri-(methoxymethyl)-acetyl-reserpate,
methyl 9,10-dimethoxy-18-O-tri-(ethoxymethyl)-acetyl-reserpate,
ethyl 9,10-dimethoxy-18-O-tri-(methoxymethyl)-acetyl-reserpate,
ethyl 9,10-dimethoxy-18-O-tri-(methoxymethyl)-acetyl-reserpate and the like,
lower alkyl 18-O-tri-(lower alkoxy-methyl)-acetyl-10,11-methylenedioxy-deserpidates, e.g.
methyl 18-O-tri-(methoxymethyl)-acetyl-10,11-methylenedioxy-deserpidate,
ethyl 18-O-tri-(methoxymethyl)-acetyl-10,11-methylenedioxy-deserpidate and the like,
lower alkyl 10-benzyloxy-18-O-tri-(lower alkoxymethyl)-acetyl-deserpidates, e.g.
methyl 10-benzyloxy-18-O-tri-(methoxymethyl)-acetyl-deserpidate,
methyl 10-benzyloxy-18-O-tri(ethoxymethyl)-acetyl-deserpidate,
ethyl 10-benzyloxy-18-O-tri-(methoxymethyl)-acetyl-deserpidate and the like,
lower alkyl 11-benzyloxy-18-O-tri-(lower alkoxy-methyl)-acetyl-deserpidates, e.g.
methyl 11-benzyloxy-18-O-tri-(methoxymethyl)-acetyl-deserpidate,
methyl 11-benzyloxy-18-O-tri-(ethoxymethyl)-acetyl-deserpidate,
ethyl 11-benzyloxy-18-O-tri-(methoxymethyl)-acetyl-deserpidate and the like,
lower alkyl 18-O-tri-(lower alkoxy-methyl)-acetyl-11-methylmercapto-deserpidates, e.g.
methyl 18-O-tri-(methoxymethyl)-acetyl-11-methylmercapto-deserpidate,
methyl 18-O-tri-(ethoxymethyl)-acetyl-11-methylmercapto-deserpidate, ethyl 18-O-tri-(methoxymethyl)-acetyl-11-methylmercapto-deserpidate and the like,
lower alkyl 11-ethylmercapto-18-O-tri-(lower alkoxymethyl-acetyl-deserpidates, e.g.
methyl 11-ethylmercapto-18-O-tri-(methoxymethyl)-acetyl-deserpidate,
ethyl 18-O-tri-(methoxymethyl)-acetyl-11-ethylmercapto-deserpidate,
n-propyl 11-ethylmercapto-18-O-tri-(n-propyloxymethyl)-acetyl-deserpidate and the like,
lower alkyl 11-fluoro-18-O-tri-(lower alkoxy-methyl)-acetyl-deserpidates, e.g.
methyl 11-fluoro-18-O-tri-(methoxymethyl)-acetyl-deserpidate,
methyl 18-O-tri-(ethoxymethyl)-acetyl-11-fluoro-deserpidate,
ethyl 11-fluoro-18-O-tri-(methoxymethyl)-acetyl-deserpidate and the like,
lower alkyl 10-chloro-18-O-tri-(lower alkoxy-methyl)-acetyl-deserpidates, e.g.
methyl 10-chloro-18-O-tri-(methoxymethyl)-acetyl-deserpidate,
methyl 10-chloro-18-O-tri-(ethoxymethyl)-acetyl-deserpidate,
ethyl 10-chloro-18-O-tri-(methoxymethyl)-acetyl-deserpidate and the like,
lower alkyl 10-bromo-18-O-tri-(lower alkoxy-methyl)-acetyl-reserpates, e.g.
methyl 10-bromo-18-O-tri-(methoxymethyl)-acetyl-reserpate,
methyl 10-bromo-18-O-tri-(ethoxymethyl)-acetyl-reserpate,
ethyl 10-bromo-18-O-tri-(methoxymethyl)-acetyl-reserpate and the like,
lower alkyl 17α-desmethoxy-17α-ethoxy-18-O-tri-(lower alkoxy-methyl)-acetyl-reserpates, e.g.
methyl 17α-desmethoxy-17α-ethoxy-18-O-tri-(methoxymethyl)-acetyl-reserpate,
methyl 17α-desmethoxy-17α-ethoxy-18-O-tri-(ethoxymethyl)-acetyl-reserpate and the like,
lower alkyl 17α-desmethoxy-18-O-tri-(lower alkoxymethyl)-acetyl-17α-n-propyloxy-reserpates, e.g.
methyl 17α-desmethoxy-18-O-tri-(methoxymethyl)-acetyl-17α-n-propyloxy-reserpate,
ethyl 17α-desmethoxy-18-O-tri-(methoxymethyl)-acetyl-17α-n-propyloxy-reserpate and the like,
lower alkyl 17α-desmethoxy-17α-isopropyloxy-18-O-tri-(lower alkoxy-methyl)-acetyl-reserpates, e.g.
methyl 17α-desmethoxy-17α-isopropyloxy-18-O-tri-(methoxymethyl)-acetyl-reserpate,
methyl 17α-desmethoxy-18-O-tri-(ethoxymethyl)-acetyl-17α-isopropyloxy-reserpate and the like,
lower alkyl 17α-desmethoxy-17α-ethoxy-18-O-tri-(lower alkoxy-methyl)-acetyl-deserpidates, e.g.
methyl 17α-desmethoxy-17α-ethoxy-18-O-tri-(methoxymethyl)-acetyl-deserpidate,
methyl 17α-desmethoxy-17α-ethoxy-18-O-tri-(ethoxymethyl)-acetyl-deserpidate,
ethyl 17α-desmethoxy-17α-ethoxy-18-O-tri-(n-propyloxymethyl)-acetyl-deserpidate and the like,
lower alkyl 17α-cyano-17α-desmethoxy-18-O-tri-(lower alkoxy-methyl)-acetyl-reserpates, e.g.
methyl 17α-cyano-17α-desmethoxy-18-O-tri-(methoxymethyl)-acetyl-reserpate,
methyl 17α-cyano-17α-desmethoxy-18-O-tri-(ethoxymethyl)-acetyl-reserpate and the like,
lower alkyl 17α-cyano-17α-desmethoxy-18-O-tri-(lower alkoxy-methyl)-acetyl-deserpidates, e.g.
methyl 17α-cyano-17α-desmethoxy-18-O-tri-(methoxymethyl)-acetyl-deserpidate and the like,
lower alkyl 17α-N-acetyl-N-methyl-amino-17α-desmethoxy-18-O-tri-(lower alkoxymethyl)reserpates, e.g.
methyl 17α-N-acetyl-N-methyl-amino-17α-desmethoxy-18-O-tri-(methoxymethyl)-reserpate and the like,
lower alkoxy-lower alkyl 18-O-tri-(lower alkoxy-methyl)-acetyl-reserpates, e.g.
2-methoxyethyl 18-O-tri-(methoxymethyl)-acetyl-reserpate,
2-methoxyethyl 18-O-tri-(ethoxymethyl)-acetyl-reserpate,
2-ethoxyethyl 18-O-tri-(methoxymethyl)-acetyl-reserpate,
2-ethoxyethyl 18-O-tri-(n-propyloxymethyl)-acetyl-reserpate,
2-methoxy-1-methylethyl 18-O-tri-(methoxymethyl)-acetyl-reserpate,
3-methoxypropyl 18-O-tri-(methoxymethyl)-acetyl-reserpate and the like,
lower alkoxy-lower alkyl 18-O-tri-(lower alkoxy-methyl)-acetyl-deserpidates, e.g.
2-methoxyethyl 18-O-tri-(methoxymethyl)-acetyl-deserpidate,
2-methoxyethyl 18-O-tri-(ethoxymethyl)-acetyl-deserpidate,
2-ethoxyethyl 18-O-tri-(methoxymethyl)-acetyl-deserpidate and the like,
N,N-di-lower alkyl-amino-lower alkyl 18-O-tri-(lower alkoxy-methyl)-acetyl-reserpates, e.g.
2-N,N-dimethylaminoethyl 18-O-tri-(methoxymethyl)-acetyl-reserpate,
2-N,N-dimethylaminoethyl 18-O-tri-(ethoxymethyl)-acetyl-reserpate,
2-N,N-diethylaminoethyl 18-O-tri-(methoxymethyl)-acetyl-reserpate,
3-N,N-dimethylaminopropyl 18-O-tri-(methoxymethyl)-acetyl-reserpate, and the like,
N,N-di-lower alkyl-amino-lower alkyl 18-O-tri-(lower alkoxy-methyl)-acetyl-deserpidate, e.g.
2-N,N-dimethylaminoethyl 18-O-tri-(methoxymethyl)-acetyl-deserpidate,
2-N,N-dimethylaminoethyl 18-O-tri-(ethoxymethyl)-acetyl-deserpidate,
2-N,N-dimethylamino-2-methyl-ethyl 18-O-tri-(methoxymethyl)-acetyl-deserpidate and the like,
or the salts of such compounds, are prepared according to the above-described procedures using the appropriate starting materials.

What is claimed is:
1. A member selected from the group consisting of a compound of the formula

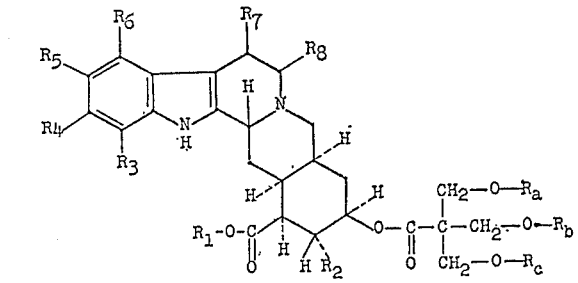

in which $R_1$ is a member selected from the group consisting of lower alkyl, lower alkoxy-lower alkyl in which lower alkyl separates lower alkoxy from the carboxyl group by at least two carbons atoms, and N,N-di-lower alkyl amino-lower alkyl, in which lower alkyl separates N,N-di-lower alkyl-amino from the carboxyl group by at least two carbons atoms, $R_2$ stands for a member selected from the group consisting of lower alkoxy, cyano and N-lower alkanoyl-N-lower alkyl-amino, each of the groups $R_a$-O-, $R_b$-O- and $R_c$-O- stands for lower alkoxy, each of the groups $R_3$, $R_4$, $R_5$ and $R_6$ stands for a member selected from the group consisting of hydrogen, lower alkyl, lower alkoxy, phenyl-lower alkoxy, halogeno, lower alkyl mercapto, and whenever two of the groups $R_3$, $R_4$, $R_5$ and $R_6$ are taken together, for lower alkylenedioxy, and each of the groups $R_7$ and $R_8$ stands for a member selected from the group consisting of hydrogen and lower alkyl, a pharmaceutically acceptable, non-toxic acid addition salt thereof, an N-oxide thereof and a pharmaceutically acceptable, non-toxic acid addition salt of the N-oxide thereof.

2. A compound of the formula

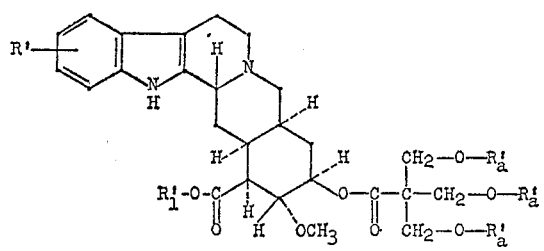

in which each of the groups $R_1'$ and $R_a'$ stands for lower alkyl, and R' stands for lower alkoxy.

3. A pharmaceutically acceptable, non-toxic acid addition salt of a compound of the formula

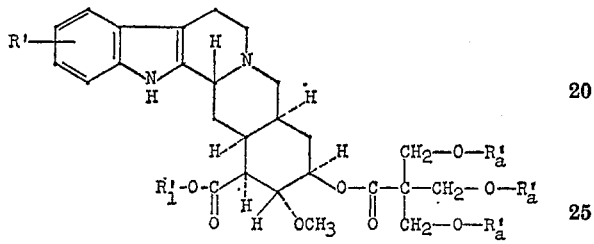

in which each of the groups $R_1'$ and $R_a'$ is lower alkyl, and R' stands for lower alkoxy.

4. Lower alkyl 18-O-tri-(lower alkoxy-methyl)-acetyl-reserpate.

5. A pharmaceutically acceptable, non-toxic acid addition salt of lower alkyl 18-O-tri-(lower alkoxy-methyl)-acetyl-reserpate.

6. Lower alkyl 18-O-tri-(methoxymethyl)-acetyl-reserpate.

7. A pharmaceutically acceptable acid addition salt of lower alkyl 18-O-tri-(methoxymethyl)-acetyl-reserpate.

8. Methyl 18-O-tri-(methoxymethyl)-acetyl-reserpate.

9. n-Propyl 18-O-tri-(methoxymethyl)-acetyl-reserpate.

10. Isobutyl 18-O-tri-(methoxymethyl)-acetyl-reserpate.

11. n-Hexyl 18-O-tri-(methoxymethyl)-acetyl-reserpate.

No references cited.